UNITED STATES PATENT OFFICE.

JOHN F. KREBS, OF COLORADO SPRINGS, COLORADO, ASSIGNOR OF ONE-HALF TO CONSTANTINE CASSER, OF COLORADO SPRINGS, COLORADO.

PAINT-OIL AND PROCESS OF MAKING SAME.

SPECIFICATION forming part of Letters Patent No. 706,961, dated August 12, 1902.

Application filed May 3, 1902. Serial No. 105,840. (No specimens.)

*To all whom it may concern:*

Be it known that I, JOHN F. KREBS, a citizen of the United States, and a resident of Colorado Springs, in the county of El Paso and State of Colorado, have invented a new and Improved Process of Making Paint-Oil and the Product of said Process, of which the following is a full, clear, and exact description.

My invention relates to paint-oil, my object being more particularly to produce a certain kind of oil of excellent quality and having good drying properties.

The oil of my invention is prepared as follows: I first place two thousand pounds of ordinary marine oil—that is to say, fatty oil made from whales or fishes—in a tank. In another tank or cask I place the following ingredients: acetic acid, (vinegar,) thirty-five gallons; zinc sulfate, (white copperas,) ten pounds; litharge, fifteen pounds. I next take five pounds of manganese dioxid (black manganese) and dissolve it in five gallons of benzin by the aid of heat. This solution I add to the three ingredients just mentioned. I next add plumbic acetate (sugar of lead) five pounds. I allow the mixture to stand one week, the cask or tank containing it being air-tight. Once every day I stir the mixture thoroughly. After the lapse of the week, as above mentioned, I empty the entire contents of the cask or tank into the tank containing the two thousand pounds of marine oil and then add ten gallons of linseed-oil, five gallons of turpentine, and a portion of chlorid of lime sufficient to clarify the oil. One hundred pounds are used for this purpose. I next allow the entire mixture to stand for a period of forty-eight hours. During this time the oil becomes considerably clearer and also becomes oxidized to a certain extent, thereby acquiring the so-called "drying" properties and being otherwise ready to mix with a suitable proportion of white lead and with any ingredients used in coloring paints.

I find that this oil is remarkably efficient in its action. It integrates perfectly with the solid parts of the paint, so as to form a typical fluid paint. The paint of which it forms a part will stand moisture and sunshine and is very durable.

Having thus described my invention, I claim as new and desire to secure by Letters Patent—

1. The process herein described, of producing a paint-oil, which consists in mixing together marine oil, acetic acid, white copperas and litharge, dissolving manganese dioxid in benzin by the aid of heat, adding said solution, together with sugar of lead, to the ingredients above mentioned, stirring all of the ingredients mentioned and allowing them to stand, then adding linseed-oil, turpentine and chlorid of lime.

2. The process herein described, of making paint-oil, which consists in dissolving manganese dioxid in benzin, mixing the solution thus made with acetic acid, zinc sulfate, litharge and sugar of lead, mixing the substance thus formed with a large proportion of marine oil, allowing the mixture to stand for some time, then adding linseed-oil, turpentine and chlorid of lime.

3. A paint-oil containing the following ingredients in the proportions stated: marine oil, two thousand pounds; acetic acid, thirty-five gallons; zinc sulfate, ten pounds; litharge, fifteen pounds; manganese dioxid, five pounds; benzin, five gallons; sugar of lead, five pounds; linseed-oil, ten gallons; turpentine, five gallons; chlorid of lime, one hundred pounds.

In testimony whereof I have signed my name to this specification in the presence of two subscribing witnesses.

JOHN F. KREBS.

Witnesses:
WILLIAM B. WUBBEN,
W. E. McCLUNG.